(12) United States Patent
Sumi

(10) Patent No.: US 12,400,510 B2
(45) Date of Patent: Aug. 26, 2025

(54) PUSHBUTTON SWITCH, PUSHBUTTON SWITCH UNIT, OPERATING UNIT, AND AMUSEMENT MACHINE

(71) Applicant: OMRON Corporation, Kyoto (JP)

(72) Inventor: Masaaki Sumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 460 days.

(21) Appl. No.: 17/996,935

(22) PCT Filed: May 28, 2020

(86) PCT No.: PCT/JP2020/021156
§ 371 (c)(1),
(2) Date: Oct. 24, 2022

(87) PCT Pub. No.: WO2021/240738
PCT Pub. Date: Dec. 2, 2021

(65) Prior Publication Data
US 2023/0162557 A1    May 25, 2023

(51) Int. Cl.
*G07F 17/32*    (2006.01)
*G06F 3/02*    (2006.01)
*H01H 13/14*    (2006.01)
*H01H 13/20*    (2006.01)

(52) U.S. Cl.
CPC ........ *G07F 17/3209* (2013.01); *G06F 3/0202* (2013.01); *G07F 17/3211* (2013.01); *G07F 17/3216* (2013.01); *H01H 13/14* (2013.01); *H01H 13/20* (2013.01)

(58) Field of Classification Search
CPC ....... G07F 17/3223; G07F 17/32; A63F 13/35
See application file for complete search history.

(56) References Cited

U.S. PATENT DOCUMENTS

| | | | |
|---|---|---|---|
| 7,892,096 B2* | 2/2011 | Rigsby | G07F 17/3209 463/16 |
| 9,147,532 B2* | 9/2015 | Meftah | H01H 3/022 |
| 9,653,235 B2* | 5/2017 | Shimoyama | H01H 3/022 |
| 9,984,837 B2* | 5/2018 | Ockert | H01H 13/14 |
| 10,431,037 B2 | 10/2019 | Jadeja | |
| 10,475,597 B2* | 11/2019 | Taborsky | H01H 3/022 |
| 10,566,148 B2* | 2/2020 | Carlson | H05B 47/10 |

(Continued)

FOREIGN PATENT DOCUMENTS

WO    2015/174092 A1    11/2015
WO    2017/094234 A1    6/2017

OTHER PUBLICATIONS

English translation of the International Search Report ("ISR") of PCT/JP2020/021156 mailed on Aug. 18, 2020.

(Continued)

*Primary Examiner* — Dmitry Suhol
*Assistant Examiner* — Jason Pinheiro
(74) *Attorney, Agent, or Firm* — METROLEX IP LAW GROUP, PLLC; Robert L. Scott, Esq.

(57) ABSTRACT

A pushbutton switch according to one or more embodiments includes an attachment fixed to one surface of a support, an operable portion removably engaged with the attachment, and a detector attached to another surface of the support. The attachment has a loose-fitting hole to loosely receive the movable magnet with the operable portion being engaged with the attachment.

13 Claims, 13 Drawing Sheets

(56) References Cited

U.S. PATENT DOCUMENTS

| | | | | |
|---|---|---|---|---|
| 10,692,666 | B2* | 6/2020 | Mora | H01H 13/14 |
| 10,998,150 | B2* | 5/2021 | Ogawa | H01H 13/52 |
| 11,024,476 | B2* | 6/2021 | Ogawa | H01H 13/52 |
| 11,289,289 | B2* | 3/2022 | Takeshita | H01H 13/14 |
| 2010/0243418 | A1* | 9/2010 | Machida | H01H 3/022 |
| | | | | 200/341 |
| 2012/0111706 | A1* | 5/2012 | Seckel | H01H 13/86 |
| | | | | 200/345 |
| 2012/0217141 | A1* | 8/2012 | Yamasaki | H01H 13/52 |
| | | | | 200/43.13 |
| 2013/0143665 | A1* | 6/2013 | Taniguchi | G07F 17/3209 |
| | | | | 463/37 |
| 2013/0199907 | A1* | 8/2013 | Sugihara | H01H 13/10 |
| | | | | 200/296 |
| 2014/0057727 | A1* | 2/2014 | Oehlert | H01H 13/063 |
| | | | | 463/46 |
| 2014/0187321 | A1* | 7/2014 | Morimoto | A63F 13/00 |
| | | | | 463/31 |
| 2014/0364235 | A1* | 12/2014 | Sugiyama | H03K 17/97 |
| | | | | 463/37 |
| 2015/0094131 | A1* | 4/2015 | Onitsuka | G07F 17/3213 |
| | | | | 463/20 |
| 2015/0094149 | A1* | 4/2015 | Sumi | H01H 13/83 |
| | | | | 463/37 |
| 2015/0122627 | A1* | 5/2015 | Pora | H01H 19/04 |
| | | | | 439/692 |
| 2015/0303658 | A1* | 10/2015 | Wu | H01H 9/08 |
| | | | | 74/529 |
| 2015/0363997 | A1* | 12/2015 | Onitsuka | G07F 17/3209 |
| | | | | 463/32 |
| 2015/0364271 | A1* | 12/2015 | Huang | H01H 13/14 |
| | | | | 74/491 |
| 2015/0367232 | A1* | 12/2015 | Onitsuka | A63F 13/24 |
| | | | | 463/38 |
| 2015/0371747 | A1* | 12/2015 | Onitsuka | G06F 3/016 |
| | | | | 335/220 |
| 2016/0189889 | A1* | 6/2016 | Pizzato | H01H 3/02 |
| | | | | 200/296 |
| 2016/0335843 | A1* | 11/2016 | Agata | H01H 13/83 |
| 2016/0335844 | A1* | 11/2016 | Onoyama | H01H 13/83 |
| 2016/0335845 | A1* | 11/2016 | Onoyama | G02B 6/0051 |
| 2017/0052617 | A1 | 2/2017 | Okuzumi et al. | |
| 2017/0243706 | A1* | 8/2017 | Yoshida | H01H 13/10 |
| 2018/0056177 | A1* | 3/2018 | Sakamoto | G05G 1/02 |
| 2018/0130617 | A1* | 5/2018 | Wu | H01H 9/285 |
| 2018/0373351 | A1 | 12/2018 | Sawada et al. | |
| 2019/0080549 | A1* | 3/2019 | Lewis | G06F 3/0202 |
| 2019/0114872 | A1* | 4/2019 | Ikeda | H04R 1/028 |
| 2019/0235563 | A1* | 8/2019 | Mäkelä | G05G 1/02 |
| 2019/0250740 | A1 | 8/2019 | Okuzumi et al. | |
| 2020/0266010 | A1* | 8/2020 | Morita | H01H 9/22 |
| 2022/0245990 | A1* | 8/2022 | Kudo | G07F 17/3216 |

OTHER PUBLICATIONS

Written Opinion("WO") of PCT/JP2020/021156 mailed on Aug. 18, 2020.

\* cited by examiner

PUSHBUTTON SWITCH, PUSHBUTTON SWITCH UNIT, OPERATING UNIT, AND AMUSEMENT MACHINE

FIELD

The present disclosure relates to a pushbutton switch, a pushbutton switch unit, an operating unit, and an amusement machine.

BACKGROUND

Patent Literature 1 describes a known pushbutton assembly. The pushbutton assembly described in Patent Literature 1 includes a display and at least one pushbutton switch. The display includes a transparent material on its display surface to support the pushbutton switch. The transparent material is a support for the pushbutton switch.

CITATION LIST

Patent Literature

Patent Literature 1: U.S. Pat. No. 10,431,037

SUMMARY

Technical Problem

In the pushbutton assembly described in Patent Literature 1, the pushbutton switch is received in an attachment opening in the transparent material. However, the structure with an opening may lower the strength of the transparent material. The pushbutton switch may be included in a machine such as an amusement machine and operated by a user with strong force. In this case, in particular, the transparent material may fracture with cracks extending from the opening.

A pushbutton switch according to one or more embodiments includes an operable portion attached to one surface of a transparent material and a detector attached to the other surface of the transparent material. The operable portion includes a press portion to be operated by a user. The detector detects the pressed state of the press portion. The pushbutton switch may be installable on the transparent material without an attachment opening. The pushbutton switch includes consumable components, specifically the press portion or other moving components, or components that support these components. Such components are to be replaceable.

The pushbutton switch thus may allow easy attachment and removal of the operable portion. The operable portion may be attachable and removable at the front surface of the transparent material to facilitate replacement. In this case, however, the operable portion is to be prevented from being removed by the user with, for example, ill intentions.

One or more embodiments is directed to a technique for preventing an operable portion from being removed from a pushbutton switch by a person other than the manager.

A switch, a unit, and a machine according to one or more embodiments have the structures described below. A pushbutton switch according to one or more embodiments includes an attachment fixed to one surface of a support being a plate, an operable portion removably engaged with the attachment, and a detector attached to another surface of the support and facing the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

An operating unit according to one or more embodiments includes a transparent support and a display together serving as a touchscreen, and a pushbutton switch. The pushbutton switch includes an attachment fixed to a surface of the transparent support opposite to the display, an operable portion removably engaged with the attachment, and a detector attached to a surface of the transparent support adjacent to the display. The detector faces the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

An amusement machine according to one or more embodiments includes a first display that displays an image for amusement, a transparent support and a second display together serving as a touchscreen, and a pushbutton switch. The pushbutton switch includes an attachment fixed to a surface of the transparent support opposite to the second display, an operable portion removably engaged with the attachment, and a detector attached to a surface of the transparent support adjacent to the second display. The detector faces the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

The technique according to one or more embodiments may prevent the operable portion from being removed from the pushbutton switch by a person other than the manager.

DETAILED DESCRIPTION

First Embodiment

One or more embodiments of the present invention (hereafter also referred to as the present embodiment) will now be described with reference to the drawings. In the present embodiment, a pushbutton switch and an operating unit according to an aspect of the present invention are included in an amusement machine.

Figure 1:
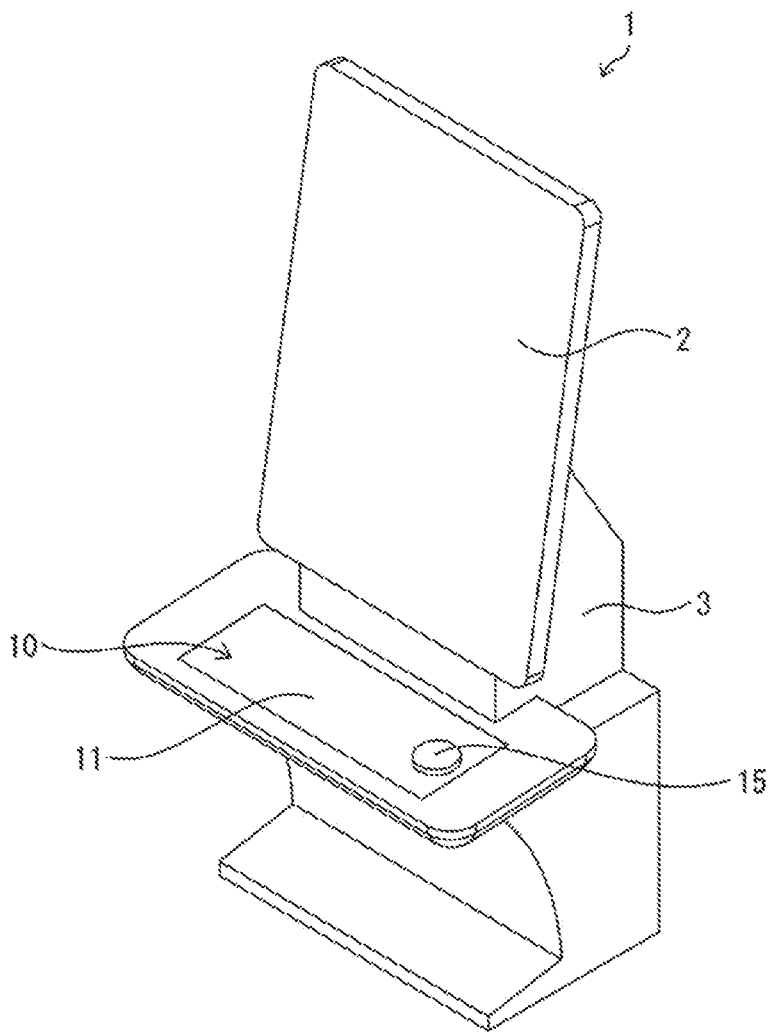
FIG. 1 is a diagram illustrating an external perspective view of an amusement machine according to a first embodiment or embodiments.
Figure 3:
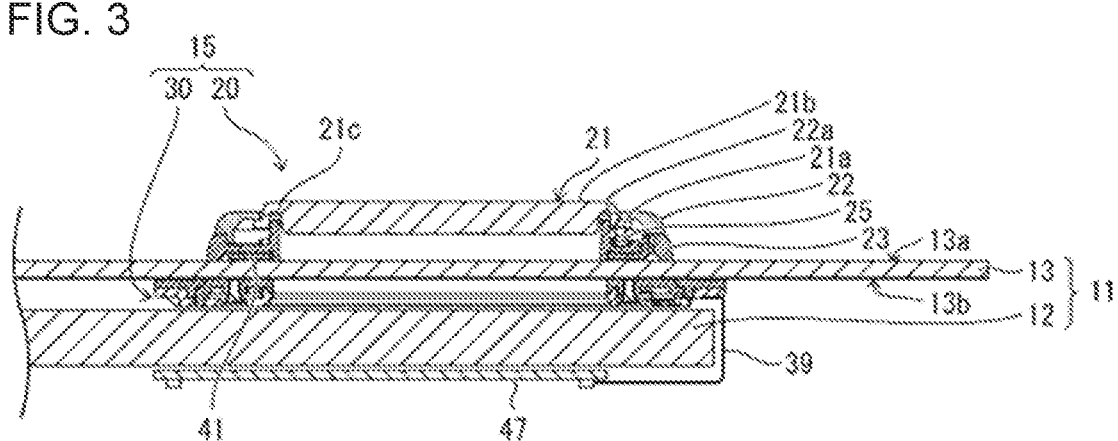
FIG. 3 is a diagram illustrating a cross-sectional view taken along line A-A as viewed in a direction indicated by arrows in FIG. 2.
Figure 4:
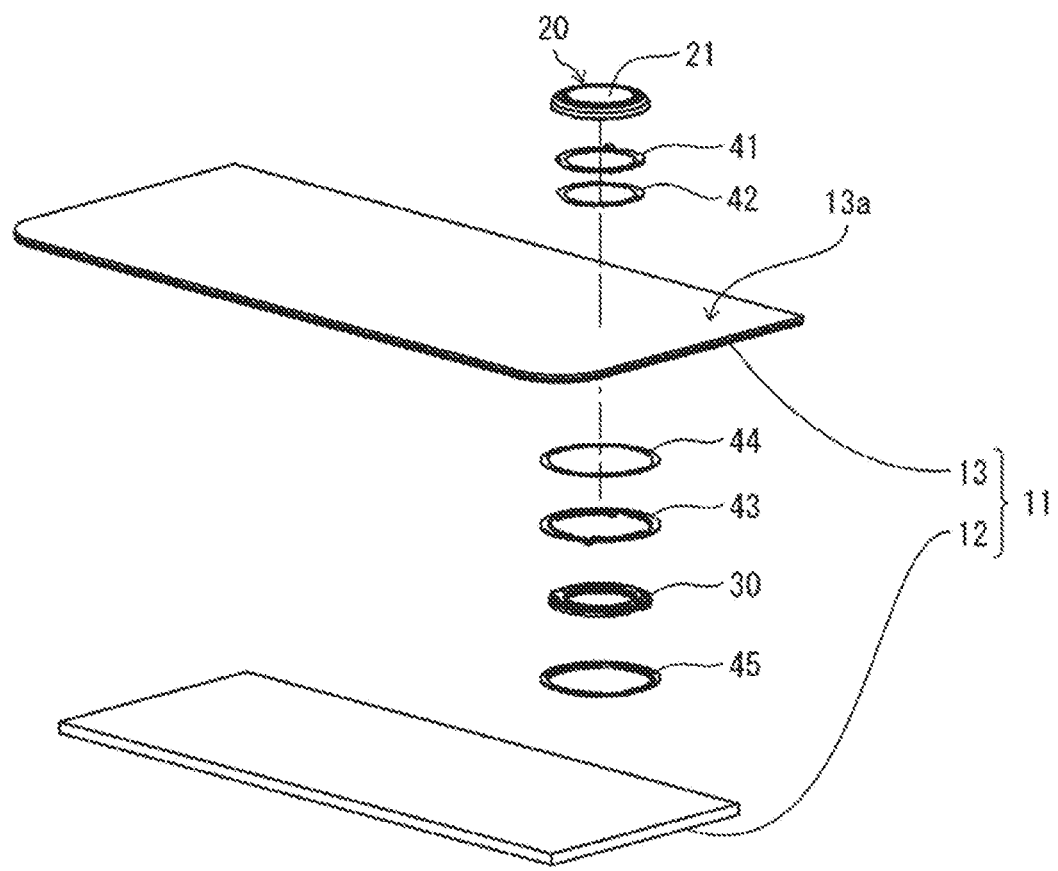
FIG. 4 is a diagram illustrating an exploded perspective view of a button deck, such as is shown in FIG. 2.

The present invention is not limited to the embodiments described below, and may be variously designed without departing from the spirit and scope of the invention. The pushbutton switch and the operating unit according to an aspect of the present invention can also be used for industrial equipment and consumer equipment, as well as for various amusement machines. 1. Example Use As shown in FIG. 1, a pushbutton switch 15 and a button deck 10, which is an operating unit including the pushbutton switch 15, may be included in an amusement machine 1. As shown in FIGS. 3 and 4, the button deck 10 includes the pushbutton switch 15 and a display input unit 11. The display input unit 11 includes a transparent support plate 13 and a display 12 and serves as a touchscreen.

The pushbutton switch 15 includes, as separate portions, an operable portion 20 and a detector 30. The operable portion 20 includes a button (a press portion) 21. The detector 30 detects the pressed state of the button 21. The operable portion 20 is attached to one surface of the transparent support plate 13. The detector 30 is attached to the other surface of the transparent support plate 13. The operable portion 20 and the detector 30 face each other with the transparent support plate 13 in between. The detector 30 includes sensors for detecting the pressed state of the button 21 through the transparent support plate 13 (with the transparent support plate 13 in between).

Figure 7:
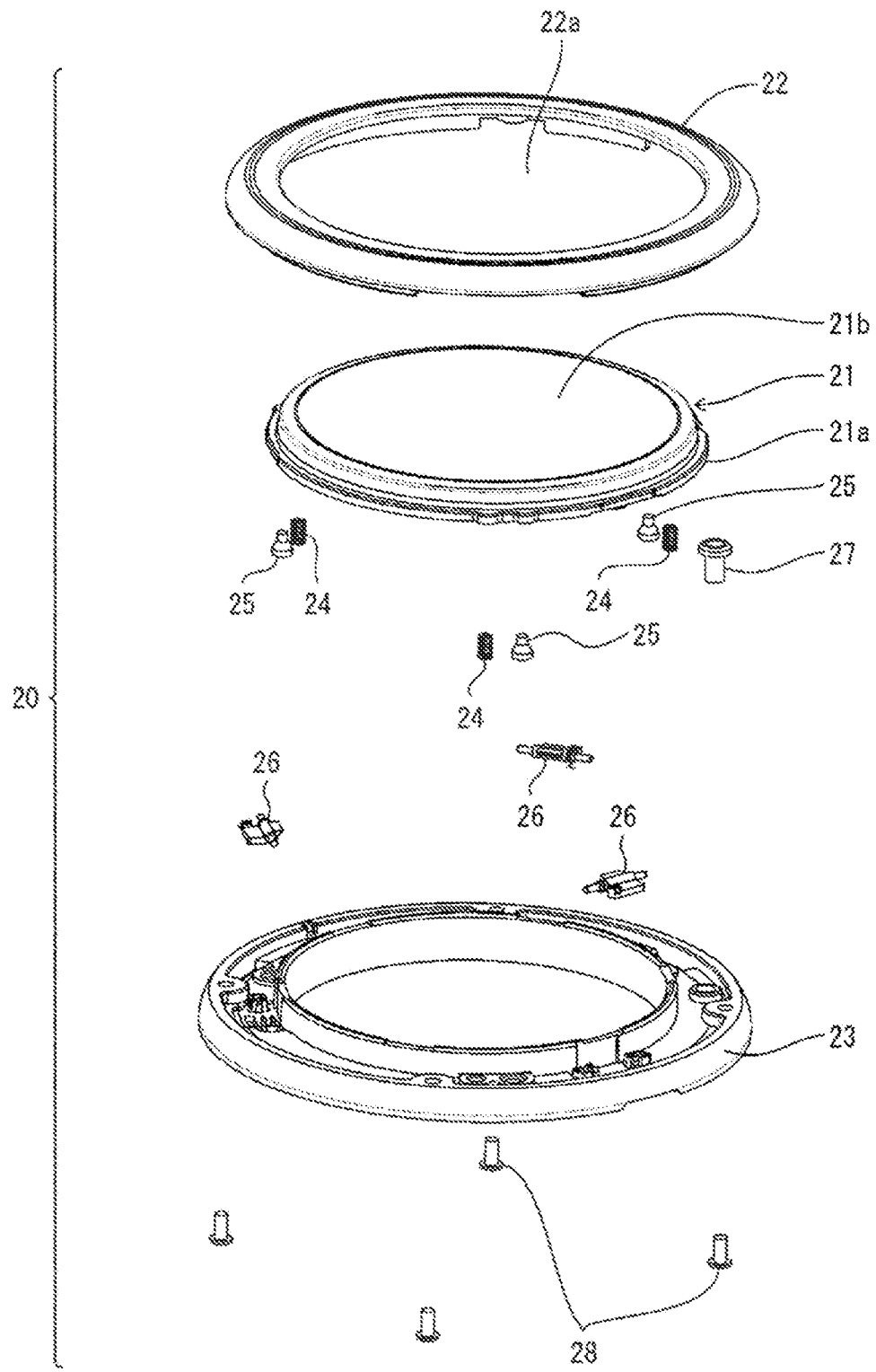
FIG. 7 is a diagram illustrating an exploded perspective view of an operable portion of a pushbutton switch in a button deck, such as is shown in FIG. 2.

As shown in FIG. 4, the operable portion 20 is attached to a first attachment 41 fixed to a first surface 13a of the transparent support plate 13. The operable portion 20 is removably engaged with the first attachment 41. As shown in FIG. 7, the operable portion 20 includes a locking magnet 27. The locking magnet 27 is a movable magnet movable in the pressing direction of the button 21 and in the direction opposite to the pressing direction.

Figure 12:
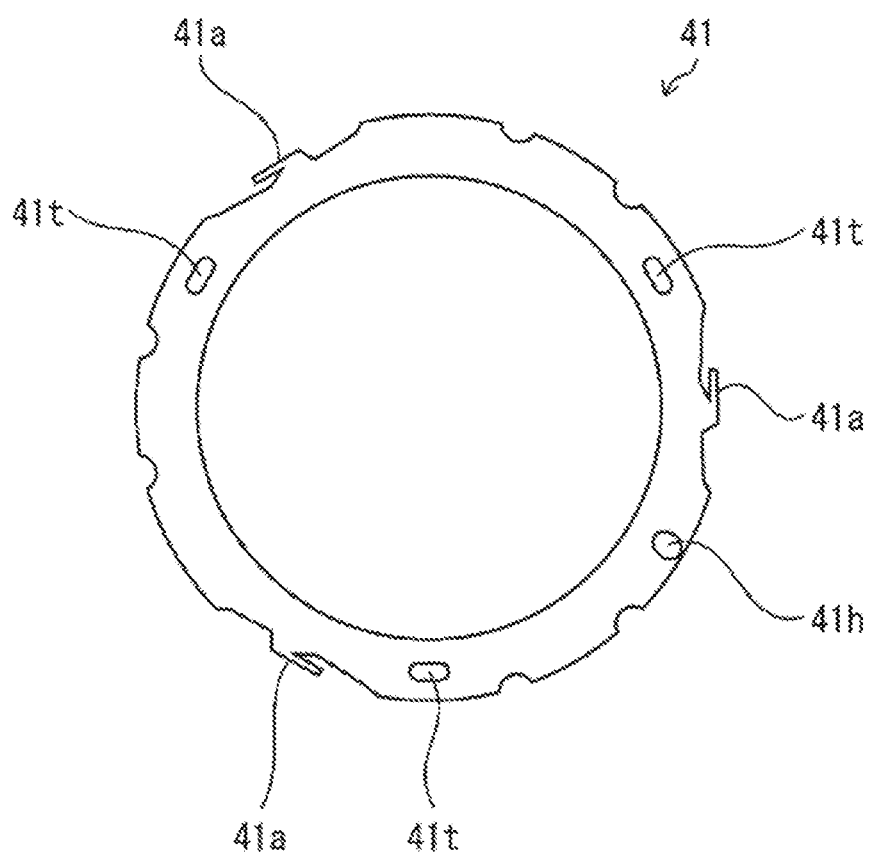
FIG. 12 is a diagram illustrating a plan view of a first attachment in a button deck, such as is shown in FIG. 4.
Figure 15:
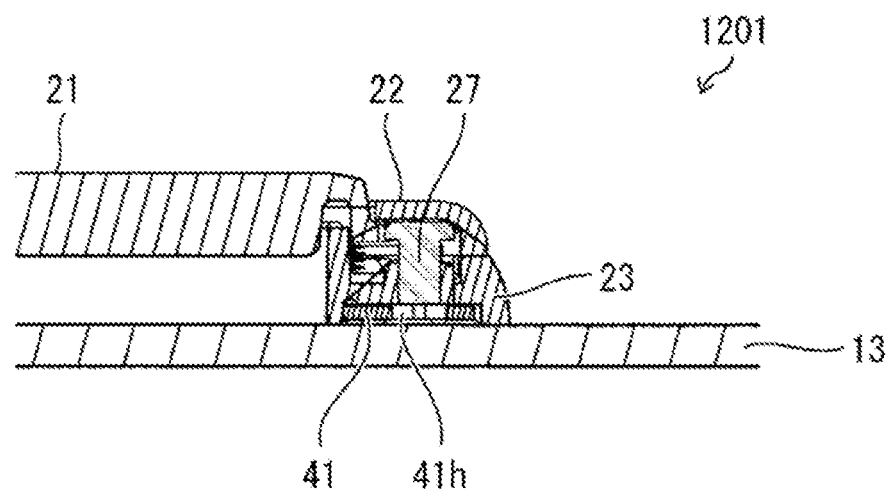
FIG. 15 is a diagram illustrating views of a lock assembly for an operable portion, such as is shown in FIG. 7.
Figure 15:
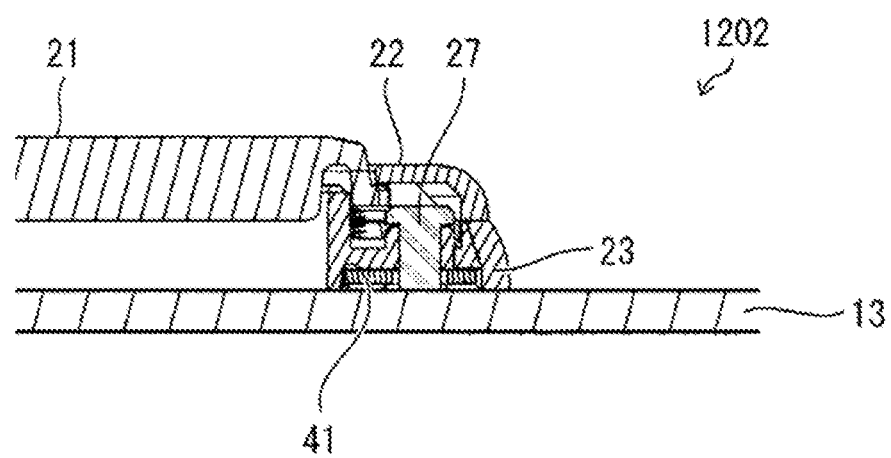

As shown in FIGS. 12 and 15, the first attachment 41 has a loose-fitting hole 41h for loosely receiving the locking magnet 27 with the operable portion 20 being engaged with the first attachment 41. When the operable portion 20 is engaged with the first attachment 41, the locking magnet 27 is loosely fitted in the loose-fitting hole 41h to lock the engaged operable portion 20. This prevents the operable portion from being removed by a person other than the manager of the amusement machine 1, such as a player.

2. Example Structure
1. Amusement Machine

The schematic structure of the amusement machine according to the present embodiment will now be described with reference to FIG. 1. FIG. 1 is an external perspective view of the amusement machine 1 according to the present embodiment.

As shown in FIG. 1, the amusement machine 1 includes a main display unit (a first display) 2, a button deck (an operating unit) 10, and a housing 3 supporting these components.

The main display unit 2 displays images for a game played on the amusement machine 1 and includes, for example, a liquid crystal display (LCD). The main display unit 2 has its display surface facing the front of the amusement machine 1.

The button deck 10 receives the player's operations in a game on the amusement machine 1. In the present example, the button deck 10 is located below the main display unit 2 at the front of the amusement machine 1. The button deck 10 is rectangular and elongated laterally. The button deck 10 includes the display input unit 11 as a touchscreen, and the pushbutton switch 15.

For the amusement machine 1 providing slot machine gaming involving spinning reels, for example, the main display unit 2 displays multiple reels with multiple types of symbols. The button deck 10 receives the player's instruction for spinning the multiple reels, and receives the number of paylines and the number of bets selected by the player.

The multiple reels start spinning in response to the player's instruction for spinning received by the button deck 10. The reels automatically stop spinning under the control of a main controller 60 (refer to FIG. 10, described later). The pattern is determined by the combination of symbols on paylines and by the symbols appearing when the multiple reels are stopped. The player is rewarded based on the determined pattern and the number of bets.

2. Button Deck

Figure 2:
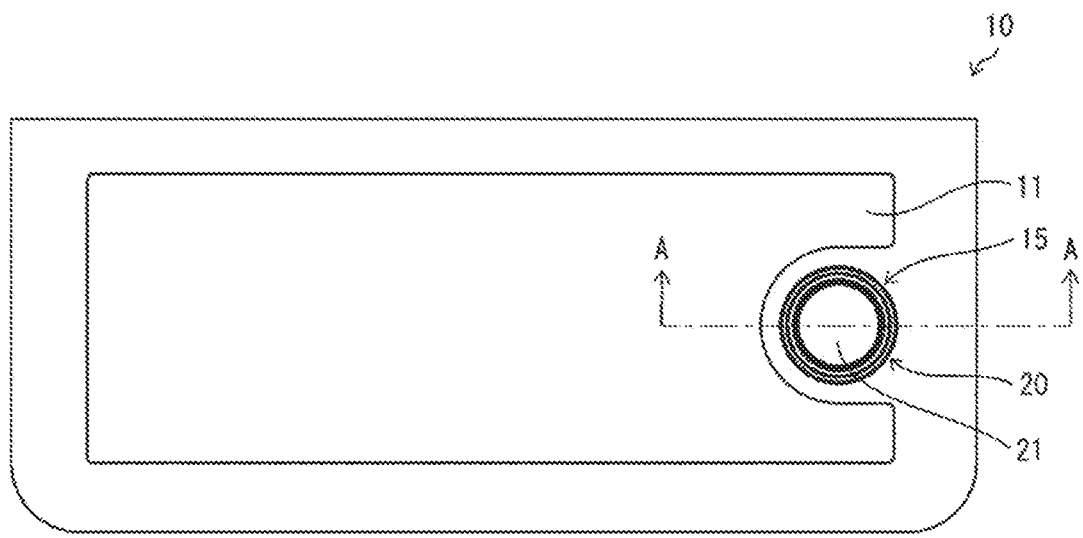
FIG. 2 is a diagram illustrating a plan view of a button deck that is an operating unit of an amusement machine, such as is shown in FIG. 1.
Figure 5:
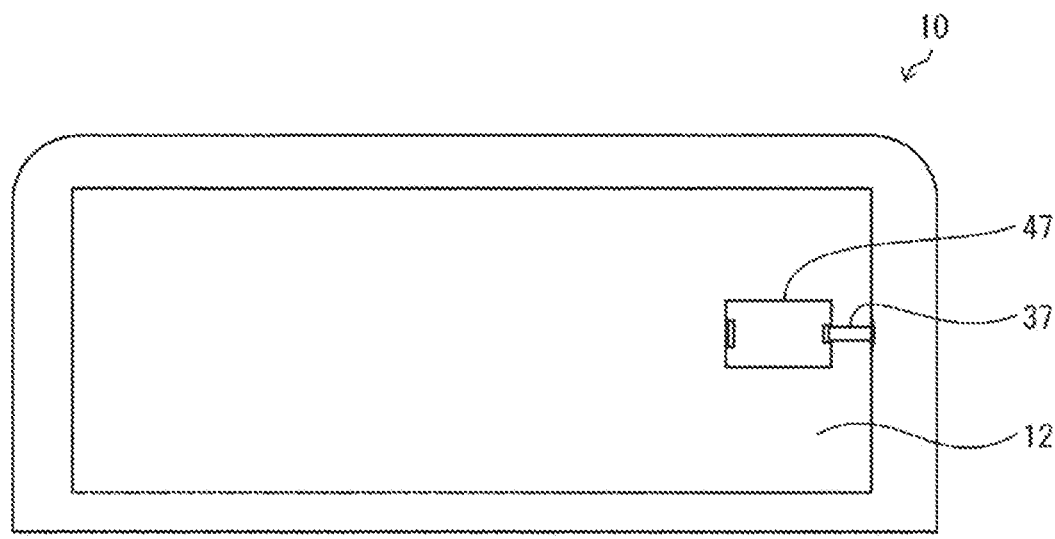
FIG. 5 is a diagram illustrating a bottom view of a button deck, such as is shown in FIG. 2.

FIG. 2 is a plan view of the button deck 10. FIG. 3 is a cross-sectional view taken along line A-A as viewed in the direction indicated by arrows in FIG. 2. FIG. 4 is an exploded perspective view of the button deck 10. FIG. 5 is a bottom view of the button deck 10.

As shown in FIG. 2, the display input unit 11 is rectangular and elongated laterally. The display input unit 11 includes the pushbutton switch 15 on its display surface. In the present example, the pushbutton switch 15 is circular and at the right end as viewed in plan (refer to FIG. 1).

As shown in FIG. 3, the display input unit 11 includes a display (a second display) 12 and a transparent support plate (a support) 13 located on the display surface of the display 12. In the present example, the transparent support plate 13 is a position input device. The transparent support plate 13 and the display 12 together serve as a touchscreen. The display 12 displays images of keys for receiving inputs to the amusement machine 1, images for a game, or other images.

The pushbutton switch 15 includes the operable portion 20 and the detector 30. The operable portion 20 is attached to one surface, specifically a first surface 13a, of the transparent support plate 13. The first surface 13a is opposite to the surface facing the display 12. The operable portion 20 includes the button (a press portion) 21 to receive a pressing operation. The button 21 is transparent.

The detector 30 is attached to the other surface, specifically a second surface 13b, of the transparent support plate 13 and faces the operable portion 20. The second surface 13b is adjacent to the display 12. The detector 30 includes sensors for detecting the pressed state of the button 21 through the transparent support plate 13.

Figure 9:
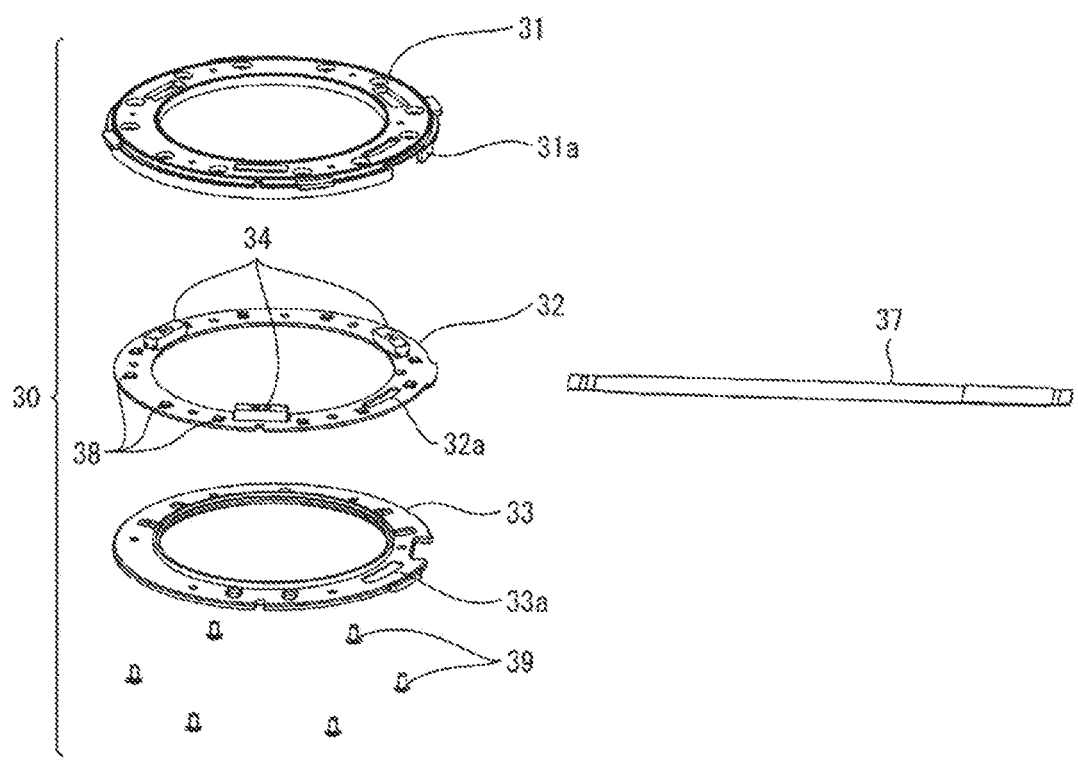
FIG. 9 is a diagram illustrating an exploded perspective view of a detector in a pushbutton switch in a button deck, such as is shown in FIG. 2.

In the present example, the sensors are reflective sensors 34 (refer to FIG. 9). However, the sensors may be any sensors other than the reflective sensors 34, such as range sensors, that can detect the pressed state of the button 21 through the transparent support plate 13. Electronic components for detecting a pressing operation may be located in the operable portion 20. Such a structure allows a wider choice of sensors.

In the present example, the detector 30 is formed from a transparent material in its area facing the button 21 to allow the display surface of the display 12 to be viewed through the transparent button 21. The detector 30 may have an opening in its area facing the button 21.

In the present example, the pushbutton switch 15 is located above the display 12. The support is the transparent support plate 13 that is entirely transparent except for its outer edge portion. However, the pushbutton switch 15 may not be located above the display 12. In this case, the support may be transparent simply in its area receiving the operable portion 20 and the detector 30, or more specifically in its area through which the sensors in the detector 30 detect the pressed state of the button 21.

In the present example, as shown in FIG. 4, the pushbutton switch 15 includes the first attachment 41 (an attachment), a second attachment 43, and a locking member 45. The operable portion 20 is attached to the first surface 13a of the transparent support plate 13 with the first attachment 41 in between. The operable portion 20 is removably engaged with the first attachment 41.

The first attachment 41 has an annular shape corresponding to the shape of a bezel 22 (refer to FIG. 7, described later) in the operable portion 20. The first attachment 41 is fixed to the first surface 13a using a double-sided tape piece 42 in the present example. Attaching the operable portion 20 to the first attachment 41 is described later.

The detector 30 is attached to the second surface 13b of the transparent support plate 13 with the second attachment 43 in between. The detector 30 is removably engaged with the second attachment 43. In the present example, the second attachment 43 together with the locking member 45 allows attachment of the detector 30 to the transparent support plate 13. Each of the second attachment 43 and the locking member 45 has an annular shape and is fitted on the outer periphery of the detector 30. The second attachment 43 receives the detector 30 on its inner periphery, and the locking member 45 is fitted on the outer periphery of the detector 30.

The locking member 45 is rotated relative to the second attachment 43 and engaged with the second attachment 43. This attaches the detector 30 to the second surface 13b. The second attachment 43 is fixed to the second surface 13b using a double-sided tape piece 44 in the present example. Further, as shown in FIGS. 3 and 5, the display 12 in the display input unit 11 has its back surface connected to a relay board (a controller) 47 (described later). The relay board 47 is connected to the detector 30 through a flexible printed circuit (FPC) 37.

Figure 6:
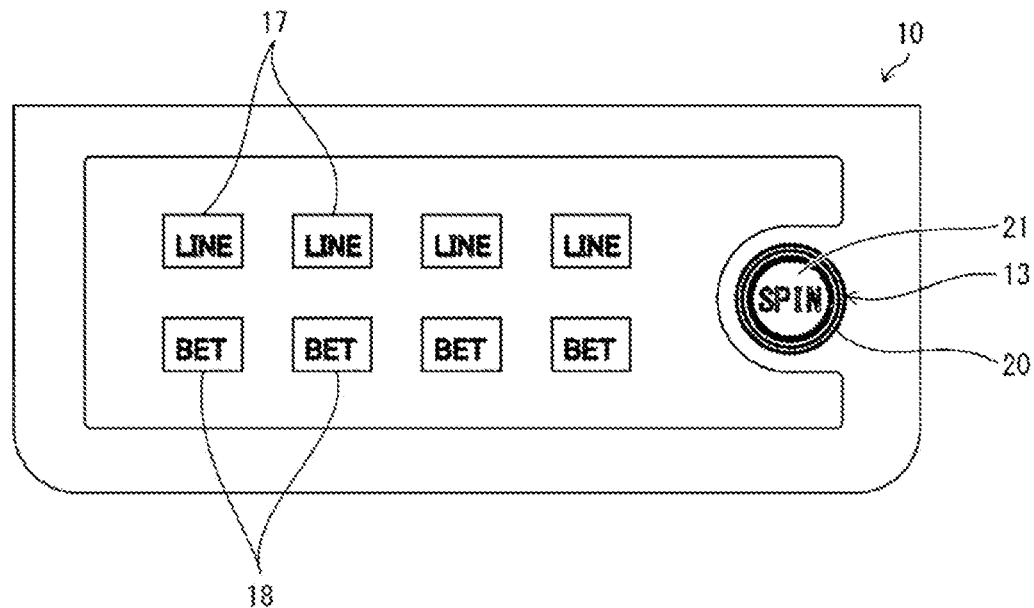
FIG. 6 is a diagram illustrating a view of an example display on a button deck, such as is shown in FIG. 2.

FIG. 6 is a view showing example display on the button deck 10. The example display in FIG. 6 shows an operation screen for a slot machine game played on the amusement machine 1. The pushbutton switch 15 serves as a SPIN button that receives the instruction for spinning the multiple reels. The display 12 displays the letters SPIN indicating the SPIN button at the position corresponding to the button 21. The letters SPIN are viewable through the transparent button 21. The display input unit 11 displays LINE buttons 17 for selecting the number of paylines and BET buttons 18 for selecting the number of bets.

3. Pushbutton Switch Structure 3-1. Operable Portion

Figure 8:
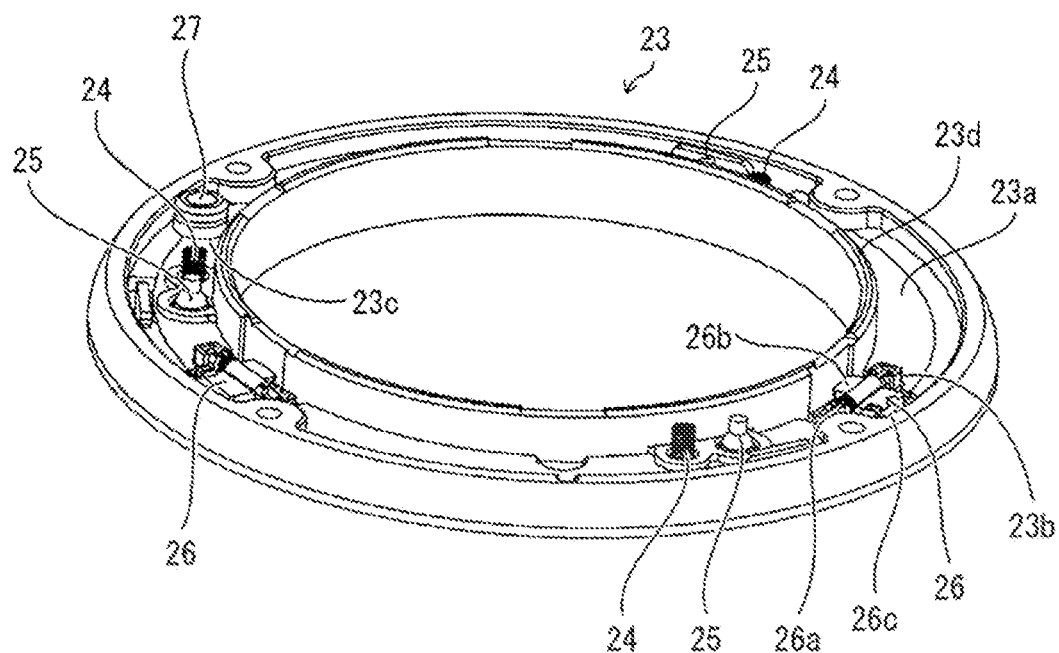
FIG. 8 is a diagram illustrating a perspective view of a base supporting multiple components in an operable portion, such as is shown in FIG. 7.

The operable portion 20 will now be described with reference to FIGS. 3, 7, and 8. FIG. 7 is an exploded perspective view of the operable portion 20 of the pushbutton switch 15 in the button deck 10. FIG. 8 is a perspective view of a base 23 supporting multiple components in the operable portion 20.

As shown in FIG. 7, the operable portion 20 includes the button 21, the bezel 22, the base 23, multiple springs 24, multiple tactile-sensation rubber pieces 25, the locking magnet 27, and multiple reflective flappers 26. The button 21 is supported between the bezel 22 and the base 23 and can receive a pressing operation. In the pushbutton switch 15, the operable portion 20 is located substantially horizontally, and the button 21 has the pressing direction being downward and the returning direction being upward.

The button 21 is formed from a transparent material and is circular in the present example (refer to FIG. 2). The button 21 includes a flange 21a on its outer periphery. The button 21 can be pressed with the flange 21a being held between the base 23 and the bezel 22 attached to the base 23. The bezel 22 has an opening 22a through which an upper surface 21b of the button 21 is exposed.

The base 23 supports, for example, the button 21, the bezel 22, the multiple springs 24, the multiple tactile-sensation rubber pieces 25, the locking magnet 27, and the multiple reflective flappers 26. The base 23 is fastened to the transparent support plate 13 with the first attachment 41 in between. The base 23 is rotatable about an axis aligned with the pressing direction from the operable portion 20 toward the detector 30 for engagement with the first attachment 41. The base 23 being engaged with the first attachment 41 can tightly fasten the operable portion 20 to the first attachment 41.

As shown in FIG. 8, the base 23 includes an annular component compartment 23a in an outer peripheral portion. The component compartment 23a accommodates the multiple springs 24, the multiple tactile-sensation rubber pieces 25, the locking magnet 27, and the multiple reflective flappers 26. The multiple springs 24 return the pressed button 21 to the position before pressing. The multiple tactile-sensation rubber pieces 25 provide a tactile sensation to the player pressing the button 21. In the present example, three springs 24 and three tactile-sensation rubber pieces 25 are included.

The multiple springs 24 and the multiple tactile-sensation rubber pieces 25 are in contact with the flange 21a on the outer periphery of the button 21 (refer to FIG. 3). The multiple springs 24 in contact with the flange 21a can return the pressed button 21 to its original position. The multiple tactile-sensation rubber pieces 25 in contact with the flange 21a can provide a tactile sensation to the player pressing the button 21.

The reflective flappers 26 are used when the detector 30 detects the pressed state of the button 21. In the present example, three (multiple) reflective flappers 26 are included. The reflective flappers 26 are supported pivotally on support portions 23b of the component compartment 23a. Each reflective flapper 26 includes a shaft 26a extending in the circumferential direction of the component compartment 23a.

Each reflective flapper 26 includes a press piece 26b located inward from the shaft 26a and a reflective portion 26c located outward from the shaft 26a. The press piece 26b comes in contact with and is pressed by a lower end 21d (refer to views 1000 and 1001 in FIG. 11) of an outer peripheral portion of the button 21. The reflective portion 26c has its lower surface being a reflective surface. The reflective flapper 26 changes its orientation in accordance with the pressed or unpressed state of the button 21 and thus changes the orientation of the reflective surface (refer to the views 1000 and 1001 in FIG. 11).

The component compartment 23a has openings at the bottom to allow passage of light from the reflective sensors 34 in the detector 30 and allow passage of light reflected by the reflective flappers 26 toward the reflective sensors 34. The first attachment 41 also has such openings, specifically openings 41t (refer to FIG. 12).

The locking magnet 27 is rod-like and has the direction of magnetization parallel to the pressing direction of the button 21. The locking magnet 27 is a movable magnet movable in the pressing direction of the button 21 and in the direction opposite to the pressing direction. The locking magnet 27 is loosely fitted in the loose-fitting hole 41h (refer to FIG. 15) in the first attachment 41 to lock the operable portion 20 and prevent removal from the first attachment 41.

The locking magnet 27 is fitted loosely in a hole 23c in the bottom of the component compartment 23a. The locking magnet 27 includes a head with a larger diameter than the other portion. The locking magnet 27 is prevented from falling out of the hole 23c with its head stuck in the hole 23c.

The component compartment 23a includes an inner peripheral wall 23d defining the component compartment 23a. The wall 23d guides the button 21 to move vertically when the button 21 is pressed or returns. As shown in FIG. 3, the button 21 has a groove 21c on its lower surface to receive the upper end of the wall 23d.

To prepare the operable portion 20, the button 21 and the bezel 22 are fitted from above in this order onto the component compartment 23a accommodating the above various components. The base 23 and the bezel 22 are then fastened together with multiple screws 28.

3-2. Detector

The detector 30 will now be described with reference to FIGS. 3 and 9. FIG. 9 is an exploded perspective view of the detector 30 in the pushbutton switch 15 in the button deck 10. As shown in FIG. 9, the detector 30 includes a case 31, a mounting board 32, a lower cover 33, the multiple reflective sensors 34, and the FPC 37.

The multiple reflective sensors 34 are mounted on the mounting board 32. In the present example, three reflective sensors 34 are included to correspond to the three reflective flappers 26 in the operable portion 20. Each reflective sensor 34 faces the corresponding reflective flapper 26 with the operable portion 20 and the detector 30 being attached to the transparent support plate 13.

The reflective sensor 34 is an optical sensor including a light emitter 34a and a light receiver 34b. The light emitter 34a emits light toward the reflective flapper 26 through the transparent support plate 13. The reflective flapper 26 reflects the light that is then received by the light receiver 34b. The light receiver 34b receives light with intensity changeable in accordance with the orientation of the reflective flapper 26. The change in light intensity thus allows detection of the pressed state of the button 21.

As shown in FIG. 9, the mounting board 32 incorporates multiple light-emitting diodes (LEDs) (light emitters or electronic components) 38 as well as the multiple reflective sensors 34. The detector 30 can thus emit light when the multiple LEDs 38 is on. The FPC 37 has one end connected to the mounting board 32 and the other end connected to the relay board 47 (refer to FIG. 3) attached to the back surface of the display 12. The FPC 37 electrically connects the mounting board 32 and the relay board 47.

The case 31 supports, for example, the mounting board 32 and the multiple reflective sensors 34. The lower cover 33 is fitted to the case 31 and covers the bottom of the detector 30. To prepare the detector 30, the lower cover 33 is fitted onto the bottom of the case 31 accommodating, for example, the mounting board 32 and the multiple reflective sensors 34. The case 31 and the lower cover 33 are then fastened together with multiple screws 39.

4. Control System in Amusement Machine

Figure 10:
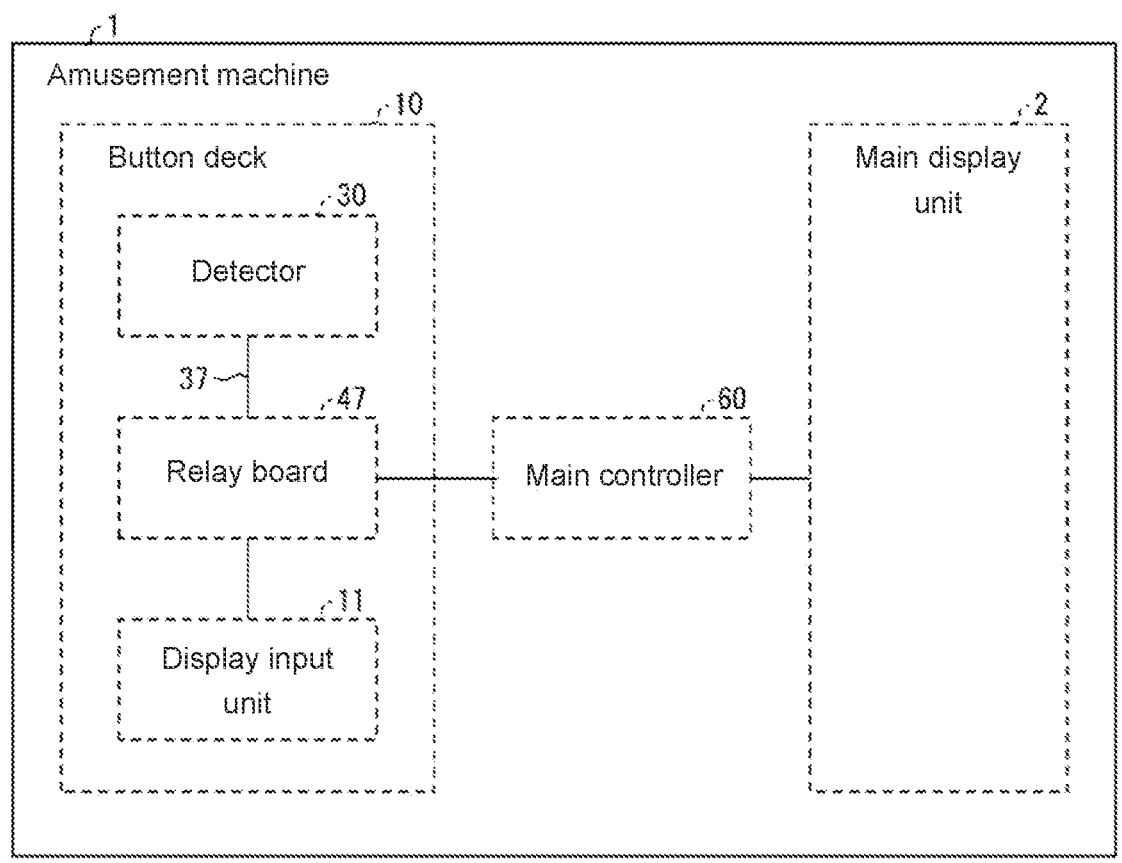
FIG. 10 is a block diagram illustrating an amusement machine, such as is shown in FIG. 1, that includes a control system.

FIG. 10 is a block diagram of the amusement machine 1, showing a control system. As shown in FIG. 10, the amusement machine 1 includes the main controller 60 and the relay board 47 as a controller. The main controller 60 is connected to the main display unit 2 and causes the main display unit 2 to display images for a game to perform the game.

The main controller 60 is also connected to the relay board 47 and receives, using the relay board 47, an instruction input on the button deck 10. The main controller 60 also controls the button deck 10 using the relay board 47. The relay board 47 controls the operation of the button deck 10, and is connected to the detector 30 through the FPC 37 and also connected to the display input unit 11 as a touch screen.

As described above, the button deck 10 in the present example includes the pushbutton switch 15 including, as separate portions, the operable portion 20 and the detector 30. The electronic components are located in the detector 30 alone attached to the second surface 13b of the transparent support plate 13 adjacent to the inside of the machine. The relay board 47 is thus unconnected to the operable portion 20.

5. Detecting Pressing Operation with Pushbutton Switch

Figure 11:
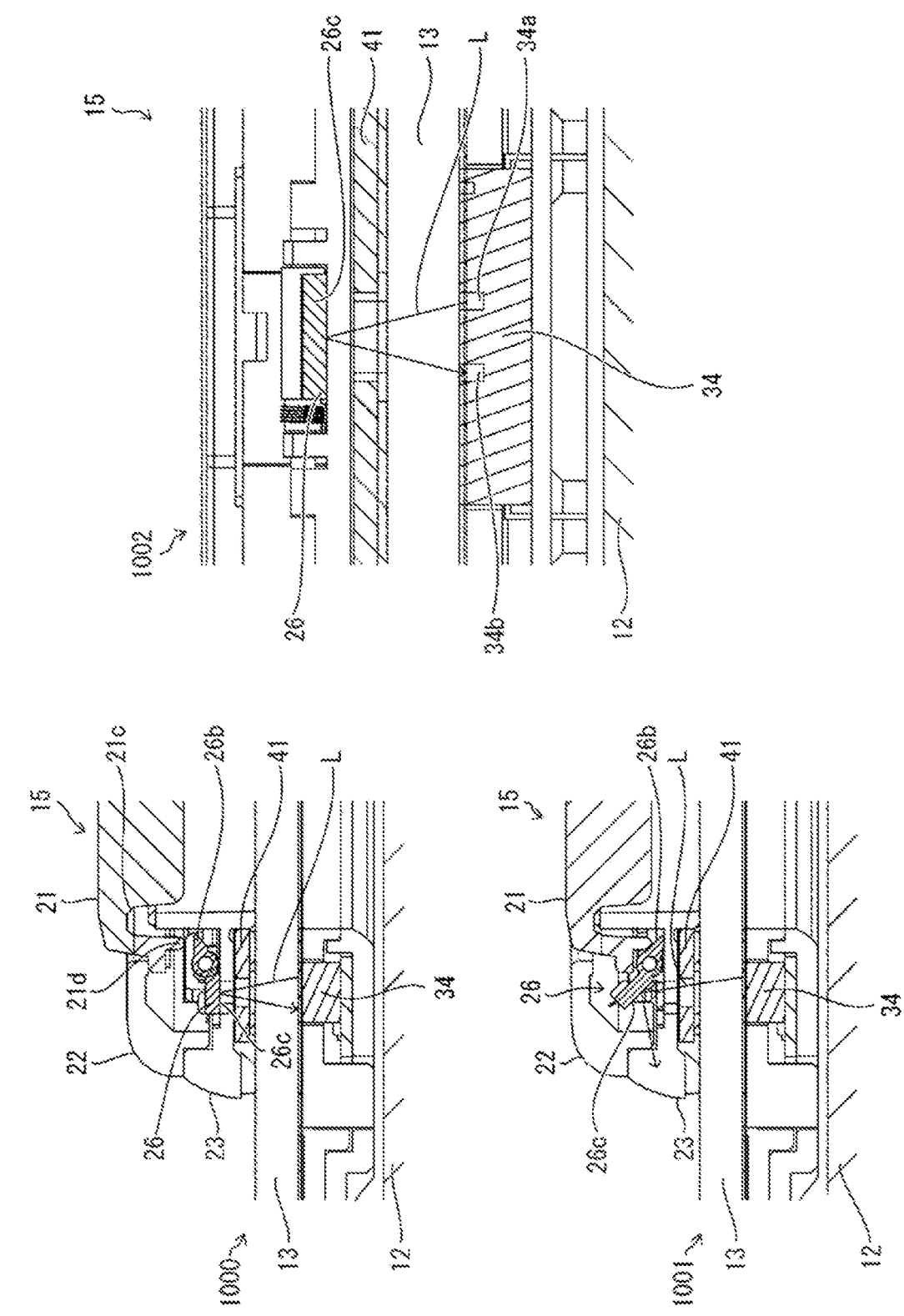
FIG. 11 is a diagram illustrating views of a structure for detecting a pressed state of a button in a pushbutton switch in a button deck, such as is shown in FIG. 2.

FIG. 11 includes views each showing a structure for detecting the pressed state of the button 21 in the pushbutton switch 15 in the button deck 10. FIG. 11 includes a cross-sectional view 1000 of the main part of the pushbutton switch 15 with the button 21 being unpressed, and includes a cross-sectional view 1001 of the main part of the pushbutton switch 15 with the button 21 being pressed. FIG. 11 also includes a cross-sectional view 1002 of the main part of the pushbutton switch 15 being unpressed. The view 1002 is taken along a line different from the line for the view 1001.

As shown in the views 1000 and 1002 in FIG. 11, when the button 21 is unpressed, each reflective flapper 26 in the operable portion 20 is in a first orientation to reflect light from the corresponding reflective sensor 34 in the detector 30 in the direction back toward the reflective sensor 34. In the first orientation, the reflective surface reflects light from the light emitter 34*a* in the direction for entry into the light receiver 34*b*.

The light receiver 34*b* receives, through the transparent support plate 13, light L emitted from the light emitter 34*a* and reflected by the reflective flapper 26 in the first orientation. The light receiver 34*b* outputs an electrical signal corresponding to the intensity of the received reflected light, and allows detection of the button 21 being unpressed based on the electrical signal.

As shown in the view 1001 in FIG. 11, when the button 21 is pressed, each reflective flapper 26 in the operable portion 20 is in a second orientation to reflect light from the corresponding reflective sensor 34 in the detector 30 in a direction different from the direction toward the reflective sensor 34. In the second orientation, the reflective surface reflects light from the light emitter 34*a* in a direction different from the direction for entry into the light receiver 34*b*.

The light receiver 34*b* does not receive light L emitted from the light emitter 34*a* and reflected by the reflective flapper 26 in the second orientation, and thus receives light with reduced intensity. The light receiver 34*b* outputs a lower electrical signal in accordance with the reduced intensity of received light. This change in the electrical signal allows detection of the button 21 being pressed.

6. Tabs 41*a* on First Attachment 41

Figure 13:
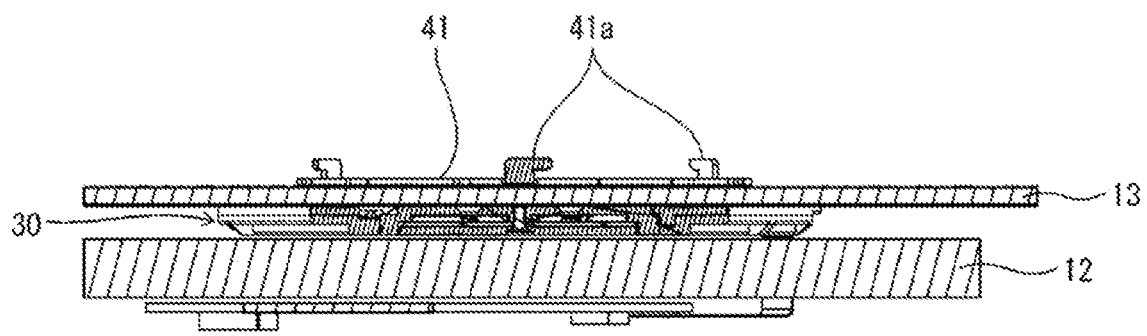
FIG. 13 is a diagram illustrating a cross-sectional view of tabs on a first attachment in a button deck, such as is shown in FIG. 4.
Figure 14:
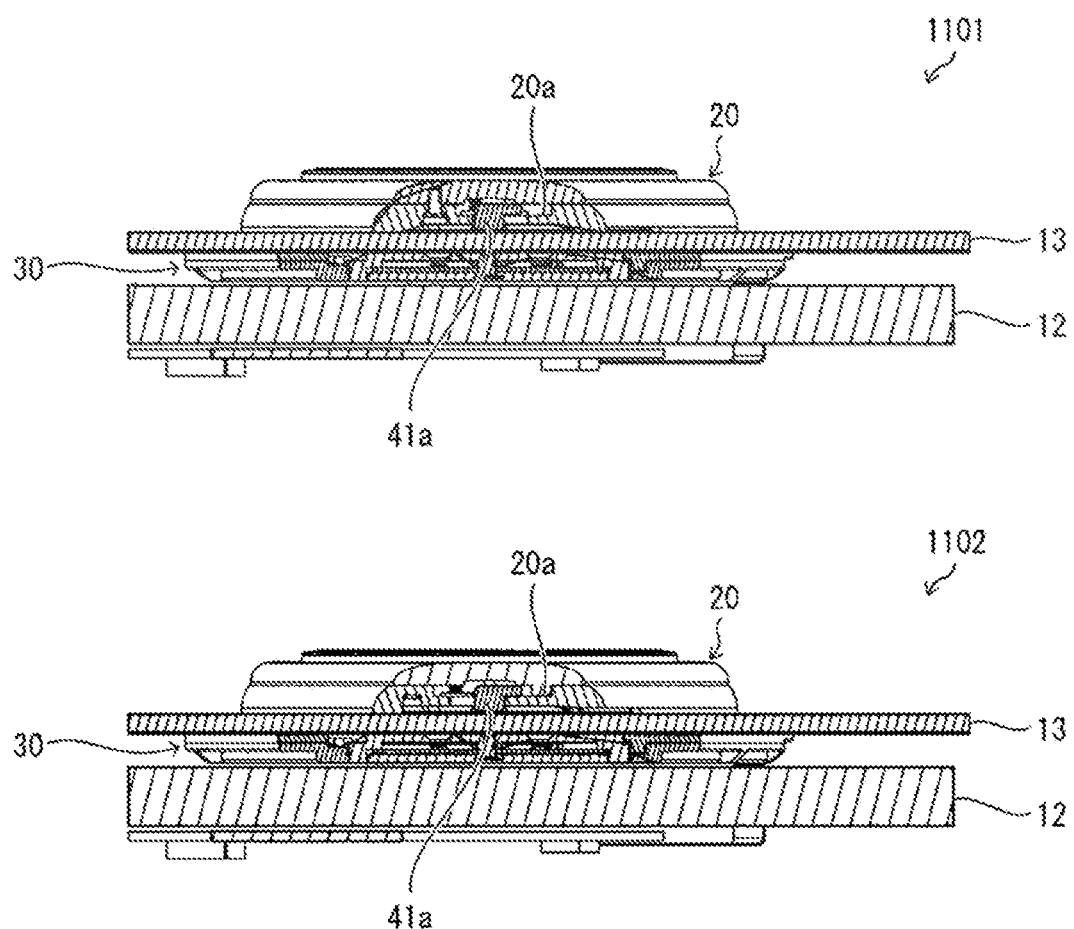
FIG. 14 is a diagram illustrating cross-sectional views of an engagement portion of a base for engagement with a corresponding tab, such as is shown in FIG. 13.

FIG. 12 is a plan view of the first attachment in the button deck shown in FIG. 4. FIG. 13 is a cross-sectional view showing tabs 41*a* on the first attachment 41 in the button deck 10 shown in FIG. 4. FIG. 14 includes cross-sectional views each showing an engagement portion 20*a* of the base 23 for engagement with the corresponding tab 41*a* shown in FIG. 13.

As shown in FIGS. 12 and 13, the first attachment 41 includes the multiple tabs 41*a* protruding upward. Each tab 41*a* is an L-shaped hook. As shown in FIG. 14, the base 23 includes the engagement portion 20*a* engageable with the tab 41*a*. The engagement portion 20*a* is circumferentially adjacent to an arc-shaped hole in the bottom surface of the base 23 extending along the outer edge of the base 23.

The engagement portion 20*a* of the base 23 in the operable portion 20 is engaged with the tab 41*a* on the first attachment 41 to engage the operable portion 20 with the first attachment 41. The base 23 in the operable portion 20 includes multiple engagement portions 20*a* corresponding to the multiple tabs 41*a*.

In the state shown in a view 1101 in FIG. 14, the tab 41*a* is spaced from the engagement portion 20*a*. When the base 23 is rotated to engage with the first attachment 41, the engagement portion 20*a* engages with the tab 41*a* as shown in a view 1102 in FIG. 14. The engagement portion 20*a* being engaged with the tab 41*a* can securely engage the operable portion 20 with the first attachment 41.

7. Lock Assembly for Operable Portion 20

FIG. 15 includes views each showing a lock assembly for the operable portion 20 shown in FIG. 7. As shown in FIGS. 12 and 15, the first attachment 41 has the loose-fitting hole 41*h* for loosely receiving the locking magnet 27 with the operable portion 20 being engaged with the first attachment 41.

FIG. 15 includes a view 1201 showing the operable portion 20 not at the position for engagement with the first attachment 41, or more specifically showing the engagement portion 20*a* of the base 23 out of engagement with the tab 41*a* on the first attachment 41. In this case, the locking magnet 27 is in contact with the upper surface of the first attachment 41, and the operable portion 20 is rotatable about an axis aligned with the pressing direction.

FIG. 15 includes a view 1202 showing the operable portion 20 rotated from the position shown in the view 1201 and engaged with the first attachment 41. More specifically, the view 1202 shows the engagement portion 20*a* of the base 23 at the position for engagement with the tab 41*a* on the first attachment 41.

In the state shown in the view 1202, the locking magnet 27 in the operable portion 20 is aligned with the loose-fitting hole 41*h* in the first attachment 41 and falls into the loose-fitting hole 41*h* under its weight. This locks the operable portion 20 in the engaged state and is unrotatable about an axis aligned with the pressing direction. The operable portion 20 is thus unremovable from the first attachment 41 fixed to the transparent support plate 13.

Unlocking the operable portion 20 in the engaged state will now be described. With the operable portion 20 being engaged with the first attachment 41, the locking magnet 27 is movable in the pressing direction and in the direction opposite to the pressing direction.

Figure 16:
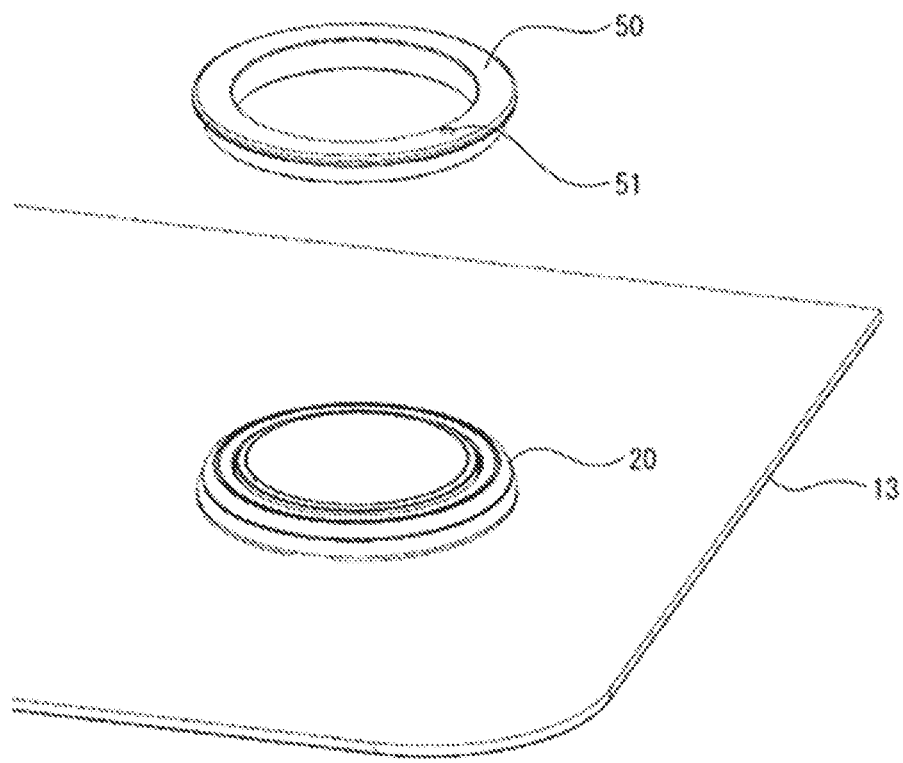
FIG. 16 is a diagram illustrating a perspective view of a button deck, such as is shown in FIG. 2 and a fixture.
Figure 17:
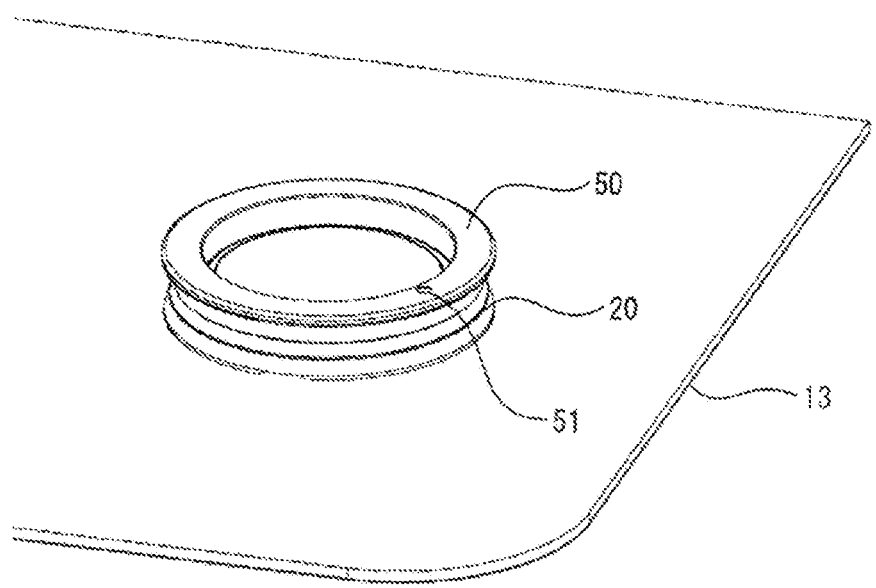
FIG. 17 is a diagram illustrating a perspective view of a button deck, such as is shown in FIG. 2 and a fixture attached to a pushbutton switch.
Figure 18:
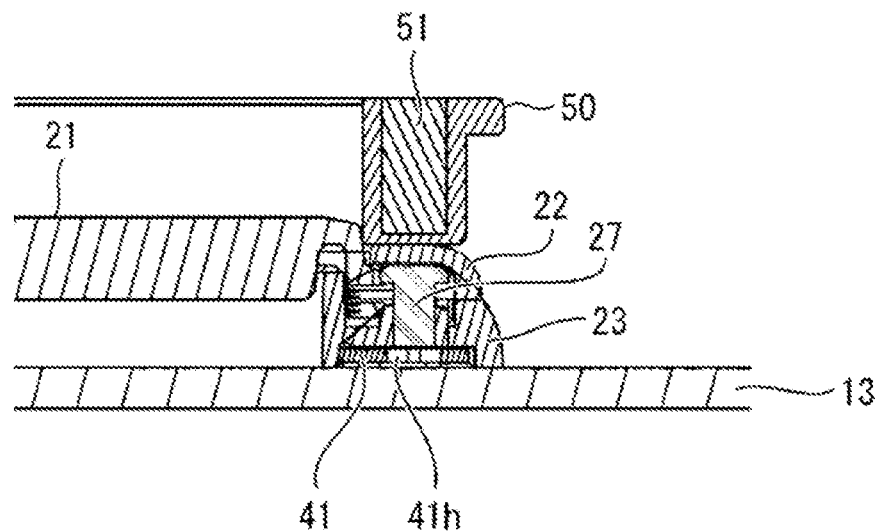
FIG. 18 is a diagram illustrating a view showing a lock assembly for an operable portion, such as is shown in FIG. 7 and a fixture unlocking an operable portion.

FIG. 16 is a view of the button deck 10 (the transparent support plate 13 and the operable portion 20) shown in FIG. 2 and a fixture 50 for unlocking the operable portion 20 in the engaged state. FIG. 17 is a view of the fixture 50 attached to the operable portion 20. FIG. 18 is a cross-sectional view of the fixture 50 attached to the operable portion 20.

As shown in FIGS. 16 and 17, the fixture 50 is annular and can cover the component compartment 23*a* in the base 23 in the operable portion 20 from above. The fixture 50 is not limited to being annular but may be, for example, circular. The fixture 50 includes an unlocking magnet 51 (a removal magnet) at a position corresponding to a position above the locking magnet 27 when the fixture 50 is attached to the operable portion 20.

In this state, the unlocking magnet 51 has the direction of magnetization parallel to the pressing direction of the button 21 and has a polarity to attract the locking magnet 27. When the fixture 50 is attached to the operable portion 20 engaged with the first attachment 41 as shown in FIG. 18, the locking magnet 27 is attracted by the unlocking magnet 51 and removed from the loose-fitting hole 41*h*. This unlocks the operable portion 20 and allows rotation of the operable portion 20 for removal from the first attachment 41 fixed to the transparent support plate 13.

8. Effects

As described above, the operable portion 20 with the above structure is difficult to remove from the transparent support plate 13 without the dedicated fixture 50 for unlocking the operable portion 20 in the engaged state. This prevents the operable portion 20 from being removed from the pushbutton switch 15 by a person other than the manager of the amusement machine 1.

The pushbutton switch 15 includes, as fully separate portions, the operable portion 20 and the detector 30 that are located on different surfaces, specifically the front and back surfaces, of the transparent support plate 13. The transparent support plate 13 thus eliminates an opening for receiving the pushbutton switch and avoids fracture due to a decrease in strength.

The above structure eliminates work for producing an opening in the transparent support plate 13 and facilitates attachment of the pushbutton switch 15. The above structure also reduces restrictions on the attachment position of the pushbutton switch 15, increasing flexibility in attachment.

A known pushbutton switch, which includes an operable portion 20 and a detector 30 integral with each other, is to have a different thickness for a transparent support plate 13 with a different thickness (or with a different depth of the attachment opening). In contrast, the pushbutton switch with the above structure is attachable to the transparent support plate 13 with a different thickness that allows the detector 30 to detect the pressed state of the button 21.

In the above structure, the electronic components for detecting the pressed state of the button 21 can be included without being located in the operable portion 20. More specifically, the multiple LEDs 38 for lighting the pushbutton switch 15 are located in the detector 30. The operable portion 20 uses no electricity and eliminates, for example, wiring, thus facilitating maintenance. The transparent support plate 13 also eliminates openings for wiring.

In the above structure, the button 21 includes a transparent portion. The detector 30 has an opening or is formed from a transparent material in its area corresponding to the button 21. This allows the screen of the display 12 to be viewed through the button 21. The first attachment 41 and the second attachment 43 facilitate attachment of the operable portion 20 and the detector 30 to the transparent support plate 13.

Second Embodiment

Another embodiment of the present invention will now be described. For ease of explanation, the components having the same functions as the components described in the above embodiment are given the same reference numerals as those components and will not be described.

In a pushbutton switch 15 according to a second embodiment, an operable portion 20 includes multiple locking magnets 27, and a first attachment 41 has multiple loose-fitting holes 41*h* for the respective locking magnets 27. The other features in the second embodiment are the same as or similar to those in the first embodiment. In the second embodiment, a fixture 50 also includes multiple unlocking magnets 51 for the respective multiple locking magnets 27.

Figure 19:
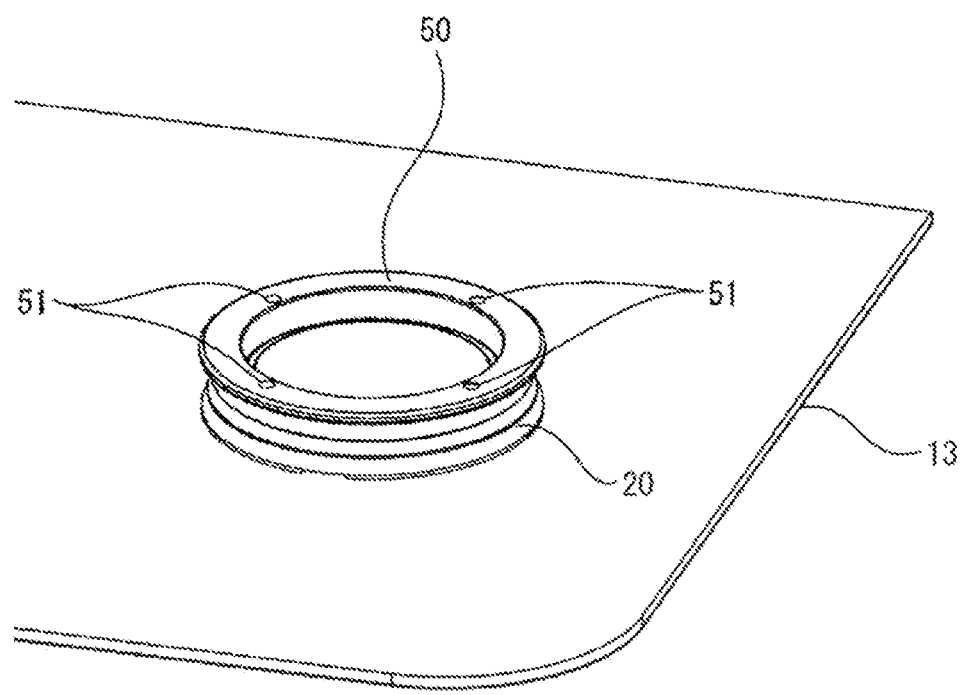
FIG. 19 is a diagram illustrating a perspective view of a button deck in a second embodiment or embodiments and a fixture attached to a pushbutton switch.

FIG. 19 is a view of a button deck 10 (a transparent support plate 13 and the operable portion 20) in the second embodiment and the fixture 50 for unlocking the operable portion 20 in the engaged state. FIG. 19 shows the fixture 50 attached to the operable portion 20. As illustrated, the fixture 50 includes, for example, four unlocking magnets 51. The operable portion 20 also includes four locking magnets 27 corresponding to the four unlocking magnets 51.

In the second embodiment, when the operable portion 20 is engaged with the first attachment 41, the locking magnets 27 are fitted in the respective loose-fitting holes 41*h* to lock the engaged operable portion 20. When the fixture 50 is attached to the operable portion 20 engaged with the first attachment 41, the locking magnets 27 are attracted by the respective unlocking magnets 51 and removed from the loose-fitting holes 41*h*.

This unlocks the operable portion 20 and allows rotation of the operable portion 20 for removal from the first attachment 41 fixed to the transparent support plate 13. An operable portion 20 including a single locking magnet 27 may be unlocked and removed with a common magnet without the fixture. In contrast, the operable portion 20 including the multiple locking magnets 27 at appropriate positions is more difficult to unlock without the dedicated fixture.

Figure 20:
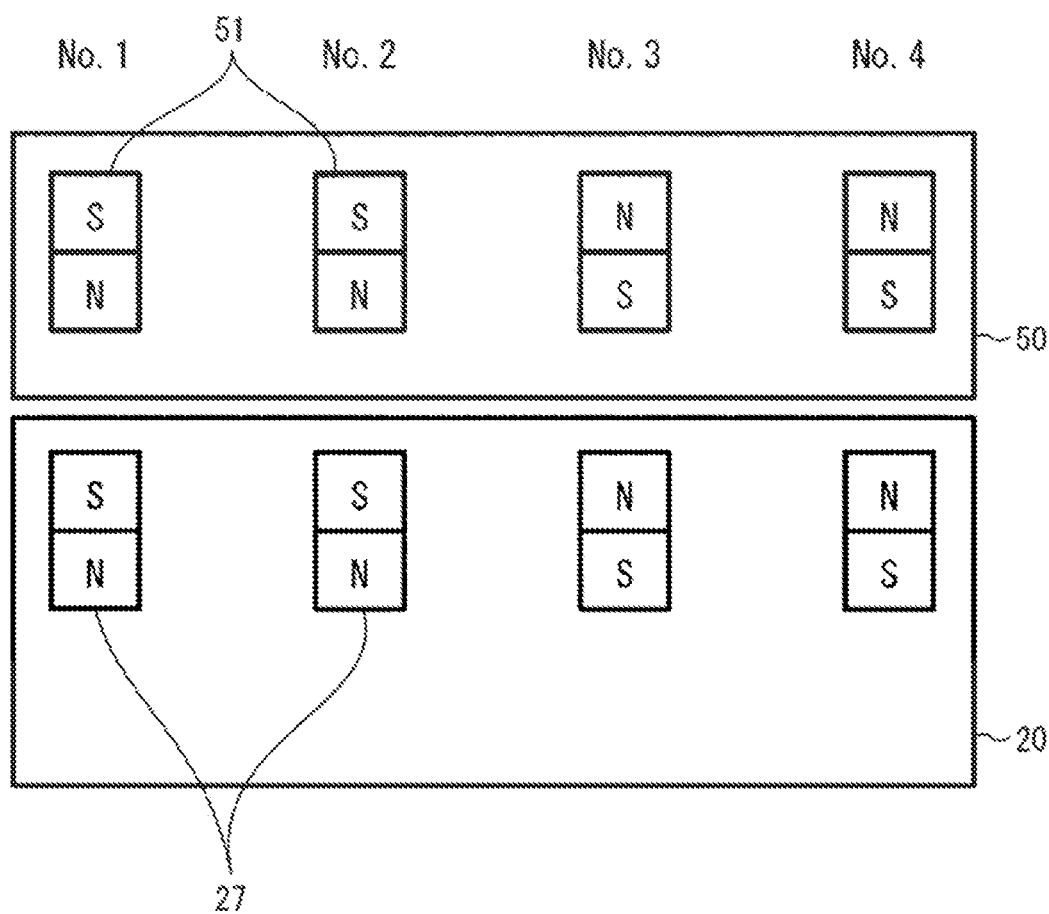
FIG. 20 is a diagram illustrating magnets in an operable portion of a pushbutton switch in a button deck, such as is shown in FIG. 19 and magnets in a fixture, showing arrangements.

FIG. 20 is a schematic diagram of the locking magnets 27 in the operable portion 20 and the unlocking magnets 51 in the fixture 50 operable portion 20, showing their polarity arrangements. The numbers in the figure indicate positions in the operable portion 20 and in the fixture 50 operable portion 20.

In the example of FIG. 20, in the operable portion 20, the poles of the locking magnets 27 adjacent to the fixture 50 are the N pole, the N pole, the S pole, and the S pole in numerical order. In the fixture 50, the poles of the unlocking magnets 51 adjacent to the operable portion 20 are the S pole, the S pole, the N pole, and the N pole in numerical order to correspond to the poles in the operable portion 20. Thus, the locking magnets 27 in the operable portion 20 are arranged to attract the corresponding unlocking magnets 51 in the fixture 50.

However, the polarity arrangement of the multiple locking magnets 27 is not limited to the example of FIG. 20. The polarity arrangement may be any one of the arrangements below, where a first pole is the S pole or the N pole, and a second pole is the pole opposite to the first pole. The arrangement may be, in numerical order, the first pole, the first pole, the first pole, and the first pole; the first pole, the first pole, the first pole, and the second pole; the first pole, the first pole, the second pole, and the second pole; and the first pole, the second pole, the first pole, and the second pole. Similarly to the above example, the unlocking magnets 51 in the fixture 50 are orientated to have polarities to magnetically attract the corresponding locking magnets 27 for the corresponding numbers.

Among the above arrangements, the second, third, or fourth arrangement combines different polarities and may allow more difficult unlocking with a single magnet. In other words, at least one of the multiple movable magnets may be oriented to have a polarity different from the polarity of at least another one of the multiple movable magnets.

Overview

A pushbutton switch according to an aspect of the present invention includes an attachment fixed to one surface of a support being a plate, an operable portion removably engaged with the attachment, and a detector attached to another surface of the support and facing the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

The above structure prevents the operable portion from being removed from the pushbutton switch by a person other than the manager. The operable portion in the engaged state is locked using the movable magnet and can be unlocked by the manager.

In the pushbutton switch according to the above aspect, the attachment may include a tab. The operable portion may include an engagement portion. The operable portion may be engaged with the attachment through engagement of the engagement portion with the tab. The above structure can securely engage the operable portion with the attachment through engagement of the engagement portion with the tab.

In the pushbutton switch according to the above aspect, the operable portion may further include a base supporting the press portion. The base may include the engagement portion. The above structure can tightly fasten the operable portion to the attachment through engagement of the base supporting the press portion with the attachment.

A pushbutton switch unit according to an aspect of the present invention includes the pushbutton switch according to the above aspect, and a fixture detachably attachable to the operable portion. The fixture includes a removal magnet that magnetically removes the movable magnet from the loose-fitting hole when the fixture is attached to the operable portion engaged with the attachment.

The above structure prevents the operable portion from being removed from the pushbutton switch by a person other than the manager. The operable portion can be unlocked by the manager using the fixture.

In the pushbutton switch according to the above aspect, the operable portion may include a plurality of the movable magnets. The attachment may have a plurality of the loose-fitting holes for the respective plurality of movable magnets. Further, at least one of the plurality of movable magnets may be oriented to have a polarity different from a polarity of at least another one of the plurality of movable magnets. The above structure more effectively prevents the operable portion from being removed from the pushbutton switch by a person other than the manager. The operable portion can be unlocked by the manager using the fixture.

A pushbutton switch unit according to an aspect of the present invention includes the pushbutton switch according to the above aspect, and a fixture detachably attachable to the operable portion. The fixture includes a plurality of removal magnets for the respective plurality of movable magnets. The plurality of removal magnets magnetically remove the respective plurality of movable magnets from the respective plurality of loose-fitting holes when the fixture is attached to the operable portion engaged with the attachment. The above structure more effectively prevents the operable portion from being removed from the pushbutton switch by a person other than the manager.

An operating unit according to an aspect of the present invention includes a transparent support and a display together serving as a touchscreen, and a pushbutton switch. The pushbutton switch includes an attachment fixed to a surface of the transparent support opposite to the display, an operable portion removably engaged with the attachment, and a detector attached to a surface of the transparent support adjacent to the display. The detector faces the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

The above structure prevents the operable portion from being removed from the pushbutton switch by a person other than the manager. The operable portion in the engaged state is locked using the movable magnet and can be unlocked by the manager.

An amusement machine according to an aspect of the present invention includes a first display that displays an image for amusement, a transparent support and a second display together serving as a touchscreen, and a pushbutton switch. The pushbutton switch includes an attachment fixed to a surface of the transparent support opposite to the second display, an operable portion removably engaged with the attachment, and a detector attached to a surface of the transparent support adjacent to the second display. The detector faces the operable portion. The operable portion includes a press portion and a movable magnet movable in a pressing direction from the operable portion toward the detector and in a direction opposite to the pressing direction. The operable portion is rotatable about an axis aligned with the pressing direction to be engaged with the attachment. The attachment has a loose-fitting hole to loosely receive the movable magnet with the operable portion being engaged with the attachment.

The above structure prevents the operable portion from being removed from the pushbutton switch by a person other than the manager. The operable portion in the engaged state is locked using the movable magnet and can be unlocked by the manager.

The present invention is not limited to the above embodiments, but may be modified variously within the spirit and scope of the claimed invention. The technical means described in different embodiments may be combined as appropriate in other embodiments within the technical scope of the invention. The technical means described in different embodiments may be combined to produce a new technical feature.

The invention claimed is:

1. A pushbutton switch, comprising:
   an attachment fixed to a first surface of a support comprising a plate;
   an operable portion removably engaged with the attachment; and
   a detector attached to a second surface of the support and facing the operable portion, wherein
   the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment,
   the attachment comprises a loose-fitting hole to loosely receive the movable magnet with the operable portion being engaged with the attachment,
   the movable magnet of the operable portion comprises a plurality of movable magnets, and
   the loose-fitting hole of the attachment comprises a plurality of loose-fitting holes for the respective plurality of movable magnets.

2. The pushbutton switch according to claim 1, wherein
   the attachment comprises a tab,
   the operable portion comprises an engagement portion, and
   the operable portion is engaged with the attachment through engagement of the engagement portion with the tab.

3. A pushbutton switch unit, comprising:
   the pushbutton switch according to claim 2; and
   a fixture detachably attachable to the operable portion,
   wherein the fixture comprises a plurality of removal magnets for the respective plurality of movable magnets, and the plurality of removal magnets magnetically remove the respective plurality of movable magnets from the respective plurality of loose-fitting holes when the fixture is attached to the operable portion engaged with the attachment.

4. The pushbutton switch according to claim 2, wherein the operable portion further comprises a base supporting the press portion, and the base comprises the engagement portion.

5. A pushbutton switch unit, comprising:
the pushbutton switch according to claim 4; and
a fixture detachably attachable to the operable portion, wherein the fixture comprises a plurality of removal magnets for the respective plurality of movable magnets, and the plurality of removal magnets magnetically remove the respective plurality of movable magnets from the respective plurality of loose-fitting holes when the fixture is attached to the operable portion engaged with the attachment.

6. The pushbutton switch according to claim 1, wherein at least one of the plurality of movable magnets is oriented to have a polarity different from a polarity of at least another one of the plurality of movable magnets.

7. A pushbutton switch unit, comprising:
the pushbutton switch according to claim 6; and
a fixture detachably attachable to the operable portion, wherein the fixture comprises a plurality of removal magnets for the respective plurality of movable magnets, and the plurality of removal magnets magnetically remove the respective plurality of movable magnets from the respective plurality of loose-fitting holes when the fixture is attached to the operable portion engaged with the attachment.

8. A pushbutton switch unit, comprising:
the pushbutton switch according to claim 1; and
a fixture detachably attachable to the operable portion, wherein the fixture comprises a plurality of removal magnets for the respective plurality of movable magnets, and the plurality of removal magnets magnetically remove the respective plurality of movable magnets from the respective plurality of loose-fitting holes when the fixture is attached to the operable portion engaged with the attachment.

9. A pushbutton switch unit, comprising:
a pushbutton switch; and
a fixture, wherein
the pushbutton switch comprises:
an attachment fixed to a first surface of a support comprising a plate;
an operable portion removably engaged with the attachment; and
a detector attached to a second surface of the support and facing the operable portion,
the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment,
the attachment comprises a loose-fitting hole to loosely receive the movable magnet with the operable portion being engaged with the attachment,
the fixture is detachably attachable to the operable portion, and
the fixture comprises a removal magnet configured to magnetically remove the movable magnet from the loose-fitting hole when the fixture is attached to the operable portion engaged with the attachment.

10. An operating unit, comprising:
a transparent support and a display together serving as a touchscreen; and
a pushbutton switch, wherein
the pushbutton switch comprises
an attachment fixed to a surface of the transparent support opposite to the display,
an operable portion removably engaged with the attachment, and a detector attached to a surface of the transparent support adjacent to the display, the detector facing the operable portion,
the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment,
the attachment has a loose-fitting hole to loosely receive the movable magnet with the operable portion being engaged with the attachment,
the movable magnet of the operable portion comprises a plurality of movable magnets, and
the loose-fitting hole of the attachment comprises a plurality of loose-fitting holes for the respective plurality of movable magnets.

11. An amusement machine, comprising:
a first display configured to display an image for amusement;
a transparent support and a second display together serving as a touchscreen; and
a pushbutton switch, wherein
the pushbutton switch comprises
an attachment fixed to a surface of the transparent support opposite to the second display,
an operable portion removably engaged with the attachment, and
a detector attached to a surface of the transparent support adjacent to the second display, the detector facing the operable portion,
the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment,
the attachment has a loose-fitting hole to loosely receive the movable magnet with the operable portion being engaged with the attachment,
the movable magnet of the operable portion comprises a plurality of movable magnets, and
the loose-fitting hole of the attachment comprises a plurality of loose-fitting holes for the respective plurality of movable magnets.

12. A pushbutton switch unit, comprising:
a pushbutton switch; and
a fixture, wherein
the pushbutton switch comprises:
an attachment fixed to a first surface of a support comprising a plate;
an operable portion removably engaged with the attachment; and
a detector attached to a second surface of the support and facing the operable portion, wherein
the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment, the attachment comprises a loose-fitting hole to loosely receive the movable magnet with the operable portion being engaged with the attachment, the attachment comprises a tab, the operable portion comprises an engagement portion, the operable portion is engaged with the attachment through engagement of the engagement portion with the tab, the fixture is detachably attachable to the operable portion, and the fixture comprises a removal magnet configured to magnetically remove the movable magnet from the loose-fitting hole when the fixture is attached to the operable portion engaged with the attachment.

13. A pushbutton switch unit, comprising:

a pushbutton switch; and a fixture, wherein the pushbutton switch comprises:

an attachment fixed to a first surface of a support comprising a plate;

an operable portion removably engaged with the attachment; and a detector attached to a second surface of the support and facing the operable portion, wherein the operable portion comprises a press portion and a movable magnet movable in a pressing direction from the operable portion toward the detector and in a direction opposite to the pressing direction, and the operable portion is rotatable about an axis aligned with the pressing direction to be engaged with the attachment, the attachment comprises a loose-fitting hole to loosely receive the movable magnet with the operable portion being engaged with the attachment, the attachment comprises a tab, the operable portion comprises an engagement portion, the operable portion is engaged with the attachment through engagement of the engagement portion with the tab, the operable portion further comprises a base supporting the press portion, and the base comprises the engagement portion, the fixture is detachably attachable to the operable portion, and the fixture comprises a removal magnet configured to magnetically remove the movable magnet from the loose-fitting hole when the fixture is attached to the operable portion engaged with the attachment.

* * * * *